US006534435B1

(12) United States Patent
Prasad et al.

(10) Patent No.: US 6,534,435 B1
(45) Date of Patent: Mar. 18, 2003

(54) PROCESS FOR IN SITU SYNTHESIS OF SUPPORTED HETEROPOLY ACIDS AND SALTS THEREOF

(75) Inventors: Potharaju S. S. Prasad, Andhra Pradesh (IN); Kondapuram V. Raghavan, Andhra Pradesh (IN); Iragavarapu Suryanarayana, Andhra Pradesh (IN); Katabathini N. Rao, Andhra Pradesh (IN); Srilakshmi Chilukoti, Andhra Pradesh (IN); Matam S. Kumar, Andhra Pradesh, MI (US); Kommasami B. Reddy, Andhra Pradesh (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/962,621

(22) Filed: Sep. 26, 2001

(51) Int. Cl.[7] .................. B01J 27/14; B01J 27/188; B01J 27/19; C01B 25/00; C01B 15/16
(52) U.S. Cl. .............. 502/208; 502/210; 502/211; 423/299; 423/305
(58) Field of Search .............. 502/208, 210, 502/211; 423/299, 305

(56) References Cited

U.S. PATENT DOCUMENTS

| 4,136,110 A | * | 1/1979 | White et al. ............ 562/532 |
| 4,307,247 A | * | 12/1981 | Shaw et al. ............ 562/599 |
| 4,338,463 A | * | 7/1982 | Shaw et al. ............ 562/599 |
| 4,358,610 A | * | 11/1982 | Pedersen et al. ......... 562/535 |
| 4,444,906 A | * | 4/1984 | Callahan et al. ........ 502/211 |
| 4,560,466 A | | 12/1985 | Kukes et al. ............ 208/89 |
| 5,087,596 A | * | 2/1992 | Clark et al. ............ 502/49 |
| 5,366,945 A | | 11/1994 | Kresge et al. ........... 502/60 |
| 5,430,161 A | * | 7/1995 | Brown et al. ........... 549/531 |
| 5,866,739 A | * | 2/1999 | Soled et al. ............ 585/467 |
| 5,919,725 A | * | 7/1999 | Soled et al. ............ 502/210 |

* cited by examiner

*Primary Examiner*—Mark L. Bell
*Assistant Examiner*—Patricia L. Hailey
(74) *Attorney, Agent, or Firm*—Nixon & Vanderhye P.C.

(57) ABSTRACT

The present invention relates to a process for the in situ synthesis of acid or cationic form of heteropolyacid of molybdenum or tungsten due to the interaction of the cationic compound with the acidic or salt form of Mo or W and the phosphate ion of a solid support.

8 Claims, 3 Drawing Sheets

X-ray diffraction pattern of the ammonium salt of the 12-molybdophosphoric acid supported on niobium phosphate.

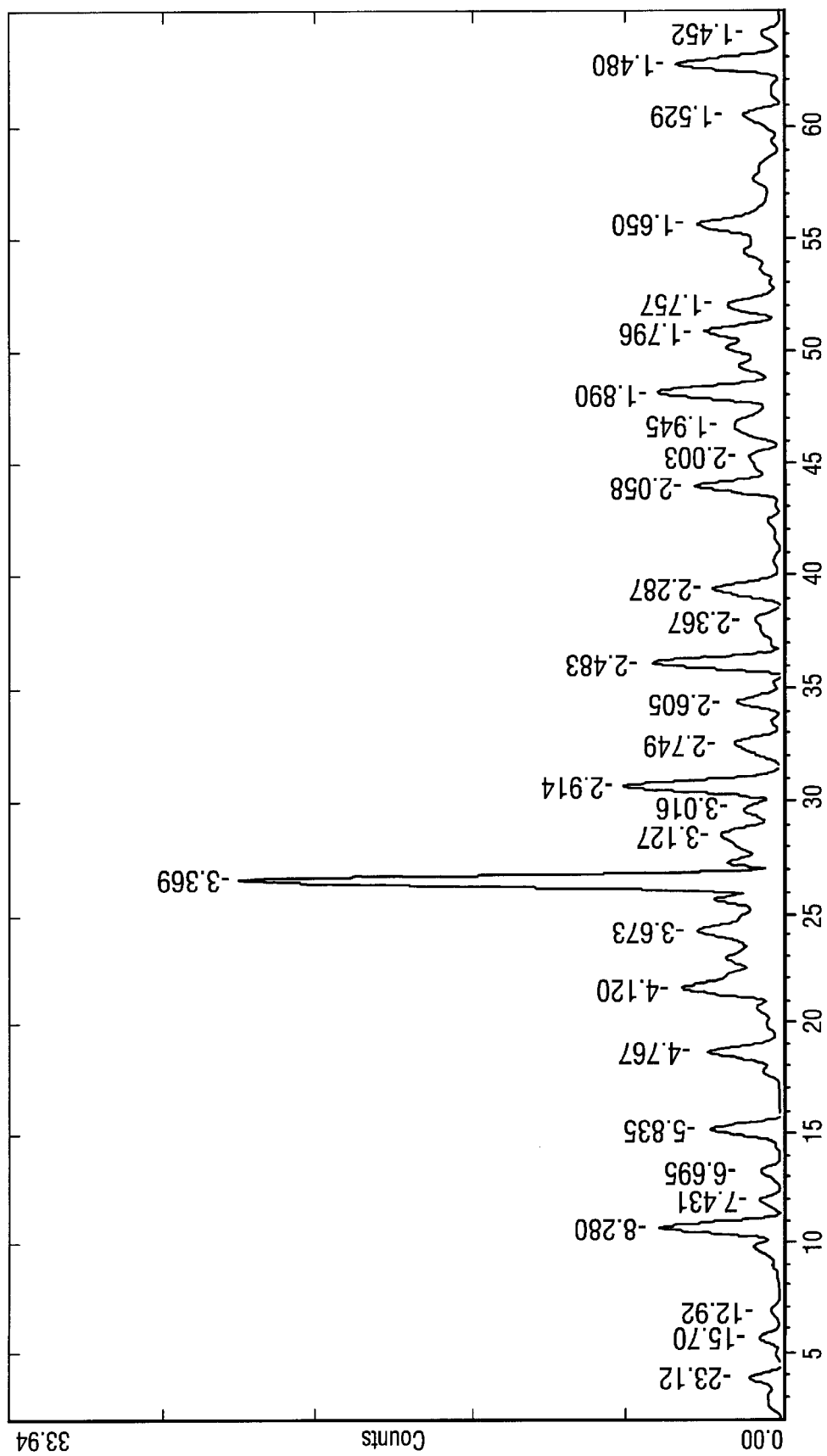
Fig. 1: X-ray diffraction pattern of the ammonium salt of the 12-molybdophosphoric acid supported on niobium phosphate.

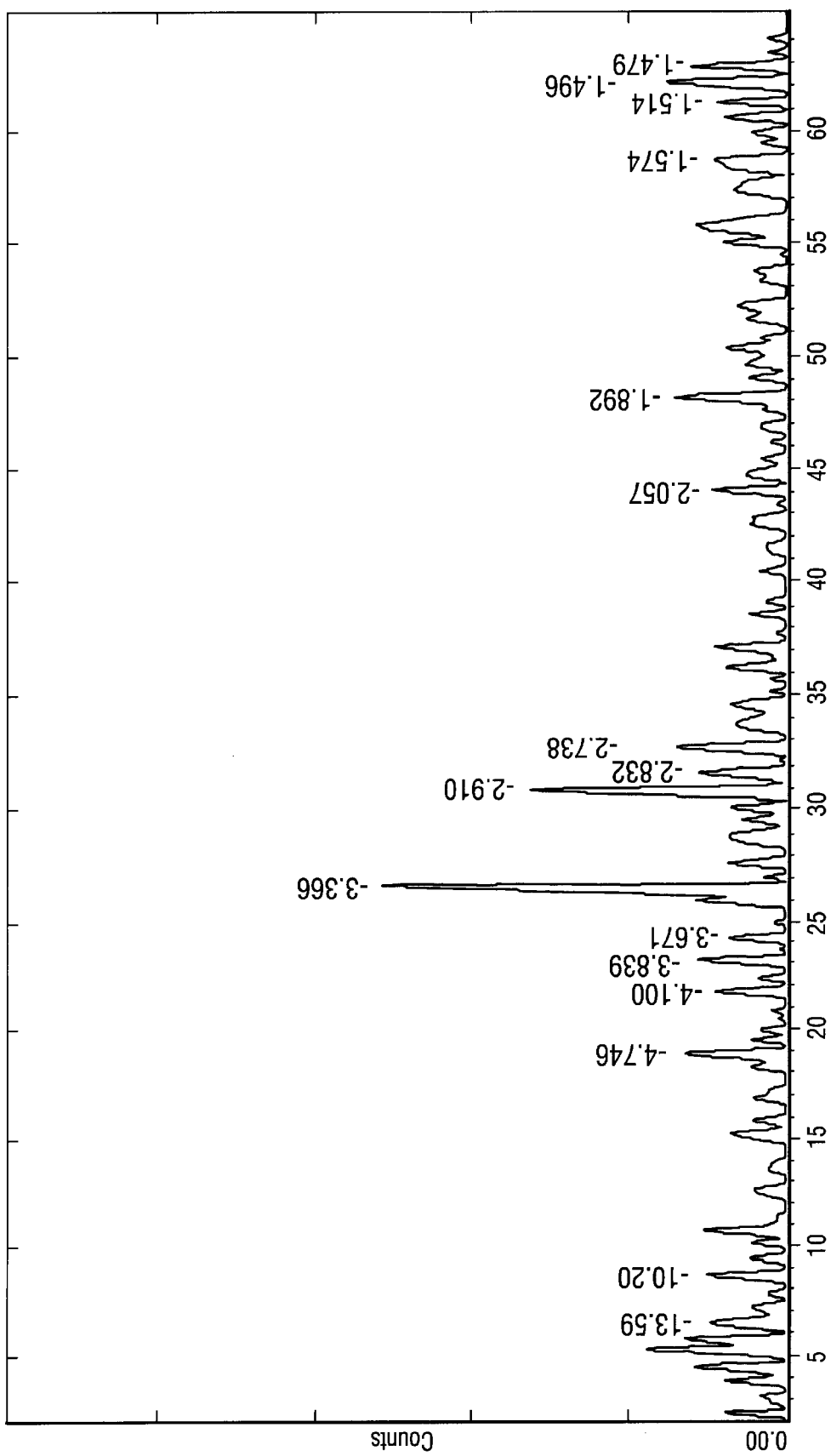
Fig.2: X-ray diffraction pattern of the ammonium salt of the 12-tungstophosphoric acid supported on niobium phosphate.

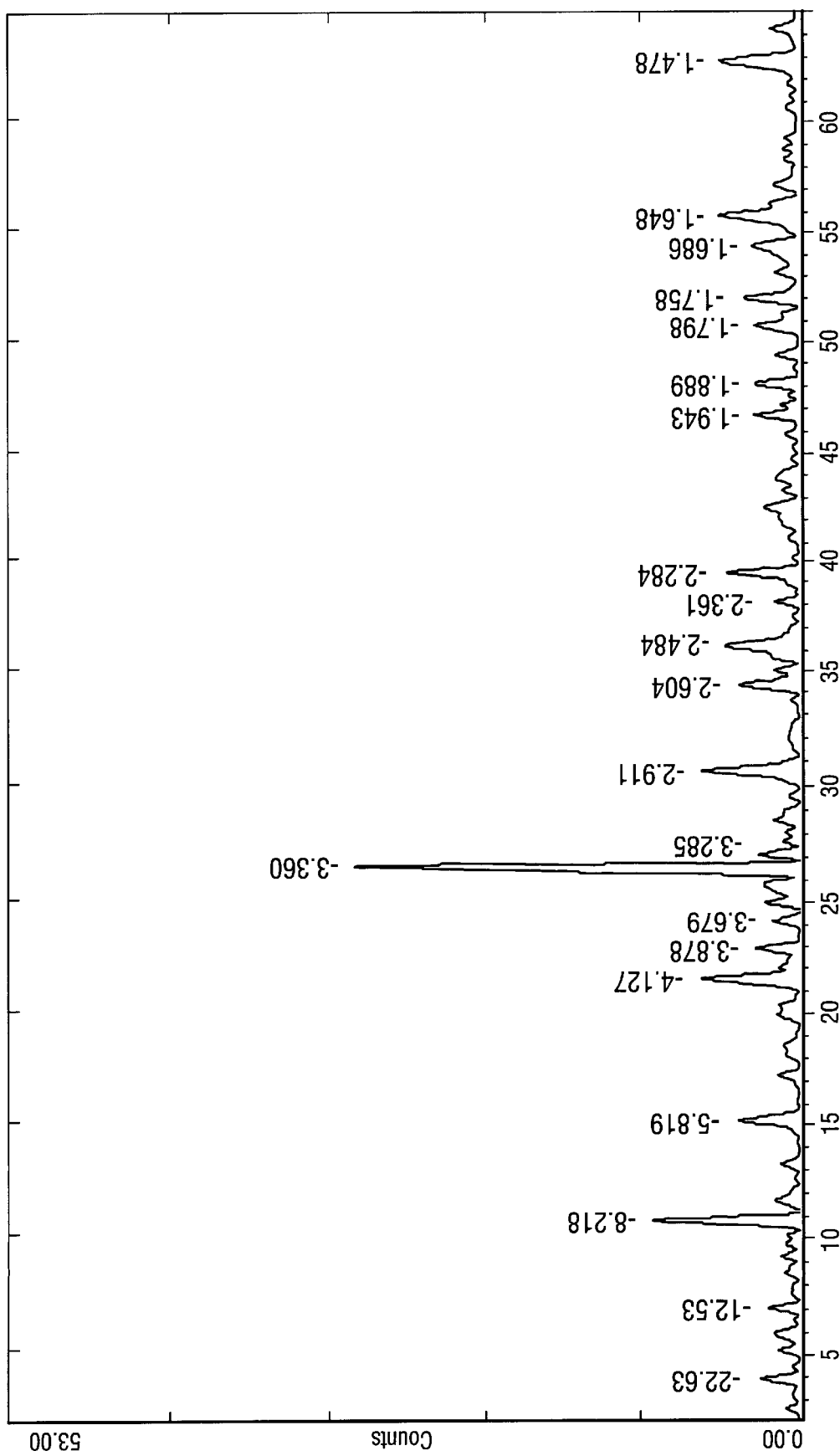
Fig. 3: X-ray diffraction pattern of the ammonium salt of the 12-molybdophosphoric acid supported on zirconium phosphate.

PROCESS FOR IN SITU SYNTHESIS OF SUPPORTED HETEROPOLY ACIDS AND SALTS THEREOF

FIELD OF THE INVENTION

The present invention relates to a process for in situ synthesis of heteropolyacids OR salts thereof on solid supports. More particularly, the present invention relates to a process for the in situ synthesis of acid or cationic form of heteropolyacid of molybdenum or tungsten due to the interaction of the cationic compound with the acidic or salt form of Mo or W and the phosphate ion of a solid support.

BACKGROUND OF THE INVENTION

Heteropolyacids are prepared by reacting the acid or the ammoniunm/other cationic salts of Mo or W with phosphoric acid or its mono or dibasic ammonium salt. The heteropolyacids are soluble in water or polar oxygenated compounds and are therefore easily deposited on supports such as alumina, silica, zirconia and the like. However, since heteropolyacids possess low thermal stability, they are normally used in their ammonium, potassium, cesium, rubidium, and like element salts. The heteropolyacid in the salt form is also not soluble in the reactant or solvent and is hence not easily washed away during the reaction.

Heteropolyacids and their salts are extensively used as catalysts in several chemical processes such as oxidation, alkylation, isomerisation reactions, since they possess excellent acid-base and redox properties. Heteropolyacids and their salts have been used as catalysts in the place of conventional acids like sulphuric acid, boron trifluoride and aluminum chloride to reduce by-product formation during the reaction and thereby act as environmentally benign catalysts. Often, the acids are used in their acid or their ammonium salt forms.

The acids when used alone or after deposition on a suitable support as catalysts get dissolved in either the reactants or in the solvent and contaminate the product. A problem observed in the case of ammonium slats of heteropolyacids is that uniformity of deposition depends on the pore diameter of the support. Quite often the salt particles are of larger size than the pore diameters of the catalyst and therefore are simply coated on the outer surface of the catalyst as large extrudates.

Deposition of the salts of heteropolyacid on any support is difficult since it is not easily soluble in any solvent. U.S. Pat. No. 5866739 discloses a procedure for the preparation of supported salts of heteropolyacid salts by first impregnating the support with the acid form of the heteropoly compound and then ion exchanging the proton with $NH^{4+}$, $K^+$, $Cs^+$, $Rb^+$ ions. This procedure could lead to partial exchange and therefore ultimately formation of the acid salt. It is also difficult to avoid formation of clusters of the acid or its salt, which reduces the available porosity [Albonetti, et al, J. Catal. Vol 146, (1994) pp.491 –5021].

What is needed is a uniformly distributed ammonium salt of the heteropolyacid on the surface of the support, preferably as a monolayer. The ammonium salt when dispersed uniformly on the support is found to offer higher activity and selectivity in certain reactions.

OBJECTS OF THE INVENTION

The main object of the present invention is to provide a process for the synthesis of a heteropolyacid or salt thereof useful as multi-functional catalysts and which is uniformly dispersed on the surface of a solid support.

It is another object of the invention to provide a process for the synthesis of a heteropolyacid or salt thereof resulting in a product offering better selectivity and activity.

It is a further object of the invention to provide an in situ process for the synthesis of a heteropolyacid or salt thereof resulting in a product with enhanced selectivity and activity.

These and other objects of the invention are achieved and the problems associated with the prior art are overcome by the process of the invention described in detail below.

SUMMARY OF THE INVENTION

The present invention relates to a novel method of catalyst preparation and its characterisation. The present invention relates to a process for the synthesis of the acid or cationic form of heteropolyacid of Mo or W by the interaction of the cationic compound with the acidic or salt form of Mo or W and the phosphate ion of a solid such as Al, Zr, Ti, or Nb taken as support, wherein the cationic salt, or a mixture of cationic salts of the heteropolyacid is formed in situ on the surface of the support. The phosphate salt of the metal used in step (a) above can be laboratory synthesised or any commercially available phosphate salt. The process of the invention avoids the cumbersome ion exchange process. The process of the invention also avoids the formation of clusters of the salt on the support. The invention also relates to process for the preparation of the catalyst composition comprising:

(a) impregnating the cationic or a mixture of the cationic compounds and the acid or salt form of Mo or W on a phosphate salt of any metal such as Al, Ti, Zr and Nb;

(b) drying in air or inert gas of the product of step (a) above at a temperature in the range of 100–150° C.;

(c) careful thermal treatment in air or inert gas at a temperature in the range of 250–400° C.

Accordingly, the present invention provides a process for the in situ synthesis of a heteropolyacid catalyst or salt thereof provided on a solid support, said process comprising (a) impregnating a support comprising the phosphate salt of a metal with a solution of the acid, or ammonium salt or the cationic form or a mixture of cationic forms of molybdenum or tungsten (b) drying the impregnated support at a temperature in the range of 100–150° C.;

(c) subjecting the dried impregnated support obtained at the end of step (b) above to careful thermal treatment at a temperature in the range of 250–400° C. to obtain the desired product.

In another embodiment of the invention, the cationic salts are selected from salts of $NH^{4+}$, $K^+$, $Cs^+$ and $Rb^+$ salts.

In a further embodiment of the invention, the cationic form of the heteropolyacid comprises the $NH^{4+}$, $K^+$, $Cs^+$ and $Rb^+$ salt of molybdenum or tungsten.

In another embodiment of the invention, the heteropolyacid comprises 12-molybdophosphoric acid or 12-tungstophosphoric acid.

In another embodiment of the invention, the support metal comprises Al, Zr, Ti or Nb.

BRIEF DESCRIPTION OF THE ACCOMPANYING DRAWINGS

FIG. 1 is an X-ray diffraction pattern of ammonium salt of 12-molybdophosphoric acid supported on niobium phosphate.

FIG. 2 is an X-ray diffraction pattern of ammonium salt of 12-tungstophosphoric acid supported on niobium phosphate.

FIG. 3 is an X-ray diffraction pattern of ammonium salt of 12-molybdophosphoric acid supported on zirconium phosphate.

DETAILED DESCRIPTION OF THE INVENTION

Heteropolyacids are prepared by reacting the ammonium/ other cationic salts of molybdenum or tungsten with phosphoric acid or its mono or dibasic ammonium salt. Heteropolyacids are soluble in water or polar oxygenated compounds and are thus easily deposited on support such as alumina, silica, zirconia and the like. However, heteropolyacids have low thermal stability. As a result, often the acids are used in their ammonium, cesium, potassium, rubidium, and like metal salts. The heteropolyacid in the salt form is not soluble in reactant or solvent and is therefore not easily washed away during the reaction being catalysed.

The supported heteropolyacids of the invention can be represented by the general formula $C_3PX_{12}O_{40}nH_2O$ wherein C is selected from $NH^{4+}$, $K^+$, $Cs^+$ and $Rb^+$, X is Mo or W, and Y is Al, Ti, Zr or Nb.

The invention utilises the phenomenon of in situ preparation of the ammonium salt or other cationic or a mixture of cationic salts of the heteropolyacid due to the interaction between the corresponding salt of Mo or W with the phosphate ion of the support. The acid or salt of the heteropolyacid, with its Keggin structure is in situ generated around the phosphate ion of the support. The preferred supports are the phosphates of Al, Ti, Zr, and Nb. However, the process of the invention cannot be limited to these specific phosphates. The supports can be either prepared in the laboratory or obtained from commercial sources. The preferred supports that can be used in the invention may have low or high BET surface area.

The support is preferably thermally treated prior to use. For example, $NbPO_4$ is calcined at about 400° C. The supports can be preformed into pellets or extrudates to be used in fixed bed reactors or can be ground to the required size for fluidised bed operations. The process is also used for preparing supported salts of heteropolyacids other than ammonium, for example the potassium, cesium, rubidium salts or a mixture thereof.

The amount of salts of heteropolyacid in the composite catalyst is preferably in the range of 2–60 wt %, more preferably in the range of 5–30 wt %.

In one embodiment, the catalysts are prepared by the impregnation of an aqueous ammonium salt solution of Mo or W, either acidified with a suitable organic or inorganic acid at room temperature or at a temperature of about 150° C., to the previously conditioned support. The impregnated supports are then dried at a temperature in the range of 80 to 120° C. and then calcined at a temperature of about 200–400° C.

The catalysts thus prepared were characterised by spectral data to understand their structural features. The X-ray diffraction patterns and the FTIR spectra of the catalysts were used to compare them with that of the X-ray diffraction data and FTIR spectra of samples reported in literature [Marchell-Roch et al, J. Catalysis., Vol. 190, 2000, p. 175–181, Academic Press; Claude Rocchiccioloeltcheff et al, J. Catalysis, Vol. 164, 1996, p. 16–27, Academic Press; Highfield et al, J. Catalysis, Vol. 88, 1984, p. 177–187, Academic Press; Bardin et al, Applied Catalysis, A. Gen., Vol. 200, 2000, p. 219–231, Elsevier Publishers] for confirmation of the formation of the salts and it was found that they were in close agreement.

The invention will now be described in greater detail with reference to the following examples, which are illustrative and should not be construed as limiting the scope of the invention in any manner.

EXAMPLE 1

6.43 gms of ammonium heptamolybdate was dissolved in 20 ml of water and this solution was used to impregnate 5 g of niobium phosphate (CBMM, Brazil) by wet impregnation method. The impregnated sample was first dried at 120° C., after the evaporation of the solution in a water bath. The dried mass was then calcined in air at 300° C. over a period of 6 hours and kept at that temperature for 4 hours. X-ray diffraction (XRD) pattern of the catalyst was obtained by using a Siemens D-5000 diffractometer using Cu $K_{60}$ radiation. FTIR spectra were recorded on a BIORAD -175 C (USA) spectrometer using the KBr disc method. The XRD pattern is shown in FIG. 1 and the FTIR spectral data given below in Table 1.

TABLE 1

FTIR data of ammonium salt of 12 - molybdophosphoric acid on niobium phosphate

| Band position | Intensity | Assignment |
|---|---|---|
| 3415 | m | OH s of water/NH s of ammonium ion |
| 3204 | m | OH s of water/NH s of ammonium ion |
| 2822 | m | OH s of water/NH s of ammonium ion |
| 1420 | m | Ammonium Ion |
| 1069 | s | Keggin ion ($v_{asym}$ P – $O_p$) |
| 963 | s | Keggin ion ($v_{asym}$ Mo – $O_d$) |
| 884 | s | Keggin ion ($v_{asym}$ Mo – $O_b$ – Mo) |
| 782 | s | Keggin ion ($v_{asym}$ Mo – $O_{c-}$ – Mo) |

EXAMPLE 2

1.04 gms of ammonium paratungstate was dissolved in 15 ml of water and this solution was used to impregnate 5 g of niobium phosphate (CBMM, Brazil) by wet impregnation method. The impregnated sample was first dried at 120° C., after the evaporation of the solution in a water bath. The dried mass was then calcined in air at 300° C. over a period of 6 hours and kept at that temperature for 4 hours. X-ray diffraction (XRD) pattern of the catalyst was obtained by using a Siemens D-5000 diffractometer using Cu $K_{60}$ radiation. FTIR spectra were recorded on a BIORAD -175 C (USA) spectrometer using the KBr disc method. The XRD pattern is shown in FIG. 2 and the FTIR spectral data given below in Table 2.

TABLE 2

FTIR data of ammonium salt of 12 - tungstophosphoric acid on niobium phosphate

| Band position | Intensity | Assignment |
|---|---|---|
| 3438 | m | OH s of water/NH s of ammonium ion |
| 3257 | m | OH s of water/NH s of ammonium ion |
| 3083 | m | $OH_{asym}$ |
| 2988 | m | $OH_{asym}$ |
| 1731 | m | $H_2O$ |
| 1423 | m | Ammonium ion |

TABLE 2-continued

FTIR data of ammonium salt of 12 - tungstophosphoric acid on niobium phosphate

| Band position | Intensity | Assignment |
|---|---|---|
| 1146 | s | Td lowering to C2v of P~O |
| 1064 | s | Td lowering to C2v of P~O |
| 980 | s | Keggin ion ($v_{asym}$ Mo – $O_d$) |
| 885 | s | Keggin ion ($v_{asym}$ Mo – $O_b$ – Mo) |
| 806 | s | Keggin ion ($v_{asym}$ Mo – $O_{c-}$ – Mo) |

EXAMPLE 3

100 gms of $ZrOCl_2$ was dissolved in 100 ml of water. 40.8 ml of 85% $H_3PO_4$ was then added to this solution. Excess water from the white precipitate thus obtained was removed by evaporation on a water bath and the material was then dried in an air oven for 4 hours at 120° C. 6.3 gms of ammonium heptamolybdate was dissolved in 18 ml of water. This solution was then added to 3 gms of the zirconium phosphate. Excess water was removed by evaporation. The sample was dried at 120° C. before being subjected to calcination at 300° C. for 4hours. The XRD pattern is shown in FIG. 3 and the FTIR spectral data given below in Table 3.

TABLE 3

FTIR data of ammonium salt of 12 - molybdophosphoric acid on zirconium phosphate

| Band position | Intensity | Assignment |
|---|---|---|
| 3419 | m | OH s of water/NH s of ammonium ion |
| 3216 | m | OH s of water/NH s of ammonium ion |
| 2826 | m | OH s of water/NH s of ammonium ion |
| 1416 | m | Ammonium ion |
| 1064 | s | Keggin ion ($v_{asym}$ P – $O_p$) |
| 992 | s | Keggin ion ($v_{asym}$ Mo – $O_d$) |
| 866 | s | Keggin ion ($v_{asym}$ Mo – $O_b$ – Mo) |
| 817 | s | Keggin ion ($v_{asym}$ Mo – $O_{c-}$ – Mo) |

EXAMPLE 4

1.04 gms of ammonium paratungstate was dissolved in 15 ml of water and this solution was used to impregnate 5 g of niobium phosphate (CBMM, Brazil) by wet impregnation method. The impregnated sample was first dried at 120° C., after the evaporation of the solution in a water bath. The dried mass was then carefully calcined in air at 300° C. over a period of 6 hours and kept at that temperature for 4 hours. X-ray diffraction (XRD) pattern of the catalyst was obtained by using a Siemens D-5000 diffractometer using Cu $K_{60}$ radiation. FTIR spectra were recorded on a BIORAD -175 C. (USA) spectrometer using the KBr disc method. The XRD pattern and the FTIR spectral data are similar to that given in FIG. 2 and in Table 2.

We claim:

1. A process for the in situ synthesis of a heteropolyacid catalyst or salt thereof provided on a solid support, said process comprising (a) impregnating a support comprising the phosphate salt of a metal with a solution of the acid or ammonium salt or the cationic form or a mixture of cationic forms of molybdenum or tungsten (b) drying the impregnated support at a temperature in the range of 100–150° C.;

(c) subjecting the dried impregnated support obtained at the end of step (b) above to careful thermal treatment at a temperature in the range of 250–400° C. to obtain the desired product.

2. A process as claimed in claim 1 wherein the cationic salts are selected from salts of $NH^{4+}$, $K^+$, $Cs^+$ and $Rb^+$ salts.

3. A process as claimed in claim 1 wherein the cationic form of the heteropolyacid comprises the $NH^+$, $K^+$, $Cs^+$ and $Rb^+$ salt of molybdenum or tungsten.

4. A process as claimed in claim 1 wherein the heteropolyacid comprises 12-molybdophosphoric acid or 12-tungstophosphoric acid.

5. A process as claimed in claim 1 wherein the support metal comprises Al, Zr, Ti or Nb.

6. A process as claimed in claim 1 wherein the hetereopolyacid or salt thereof is formed due to the reaction between the acid form or ammonium salt form or cationic or a mixture of cationic salts of molybdenum or tungsten starting material and the phosphate ion of the support.

7. A process as claimed in claim 1 wherein the salt impregnated on said support prior to heating is selected from ammonium heptamolybdate and ammonium paratungstate.

8. A process as claimed in claim 1 wherein the solution of acid or ammonium salt or the cationic form or a mixture of cationic forms of molybdenum or tungsten is in water.

* * * * *